(12) United States Patent
Huo et al.

(10) Patent No.: US 11,543,379 B2
(45) Date of Patent: Jan. 3, 2023

(54) METHOD OF AND APPARATUS FOR MANUFACTURING AT LEAST ONE MEASURING CELL

(71) Applicant: Endress+Hauser Conducta, Inc., Anaheim, CA (US)

(72) Inventors: Jinshan Huo, Corona, CA (US); Dennis Hui, Hacienda Heights, CA (US); Alden David, Aliso Viejo, CA (US)

(73) Assignee: Endress+Hauser Conducta Inc., Anaheim, CA (US)

( * ) Notice: Subject to any disclaimer, the term of this patent is extended or adjusted under 35 U.S.C. 154(b) by 425 days.

(21) Appl. No.: 16/876,773

(22) Filed: May 18, 2020

(65) Prior Publication Data

US 2021/0356422 A1 Nov. 18, 2021

(51) Int. Cl.
*G01N 27/333* (2006.01)

(52) U.S. Cl.
CPC ....... *G01N 27/3335* (2013.01); *G01N 27/333* (2013.01)

(58) Field of Classification Search
None
See application file for complete search history.

(56) References Cited

FOREIGN PATENT DOCUMENTS

JP 2003207477 A * 7/2003

* cited by examiner

*Primary Examiner* — J. Christopher Ball
(74) *Attorney, Agent, or Firm* — Christopher R. Powers; Endress+Hauser (USA) Holding, Inc.

(57) ABSTRACT

A method of and an apparatus for manufacturing a measuring cell comprising a tube having a first end capped by a membrane of an ion-selective material, comprising the steps of: providing a paste comprising all constituents of the ion-selective material; mounting the tube onto a stick with a tip such that the stick extends through the tube; dispensing an amount of the paste onto the tip; heating the first end of the tube and the dispensed paste to a temperature causing the dispensed paste to melt and the thus-produced melt to form a film covering the tip and an end surface of the first end of the tube; transforming the film into the membrane joined to the tube by cooling the first end of the tube and the film to a temperature below a melting point of the ion-selective material; and separating the thus-manufactured measuring cell from the stick.

14 Claims, 4 Drawing Sheets

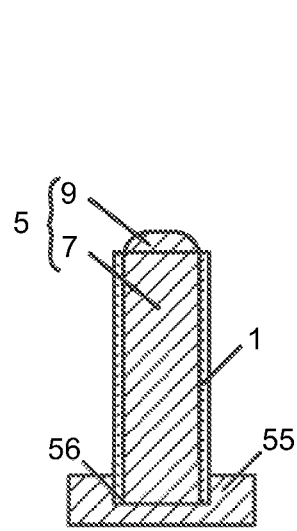 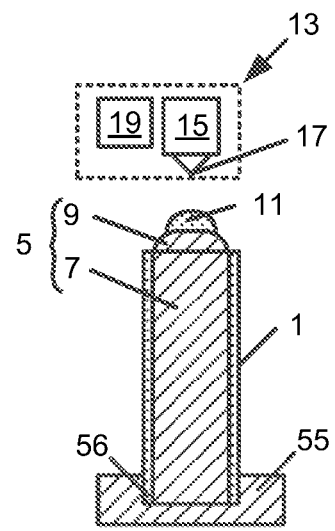
Fig. 1a                    Fig. 1b
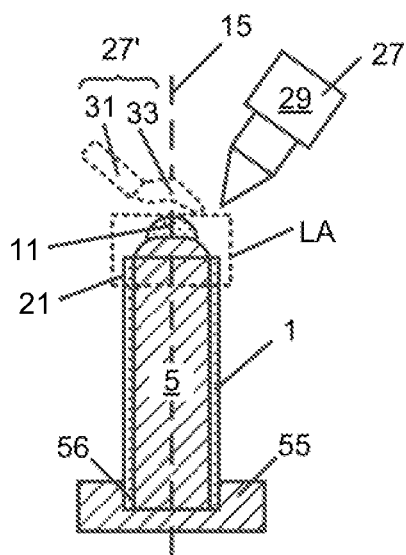 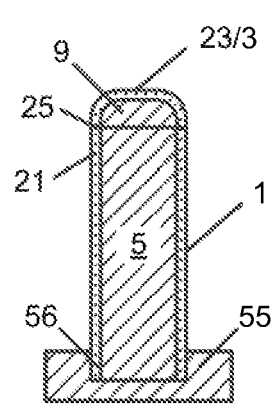
Fig. 1c                    Fig. 1d
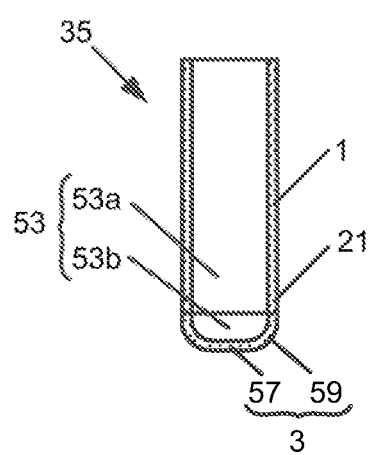
Fig. 2

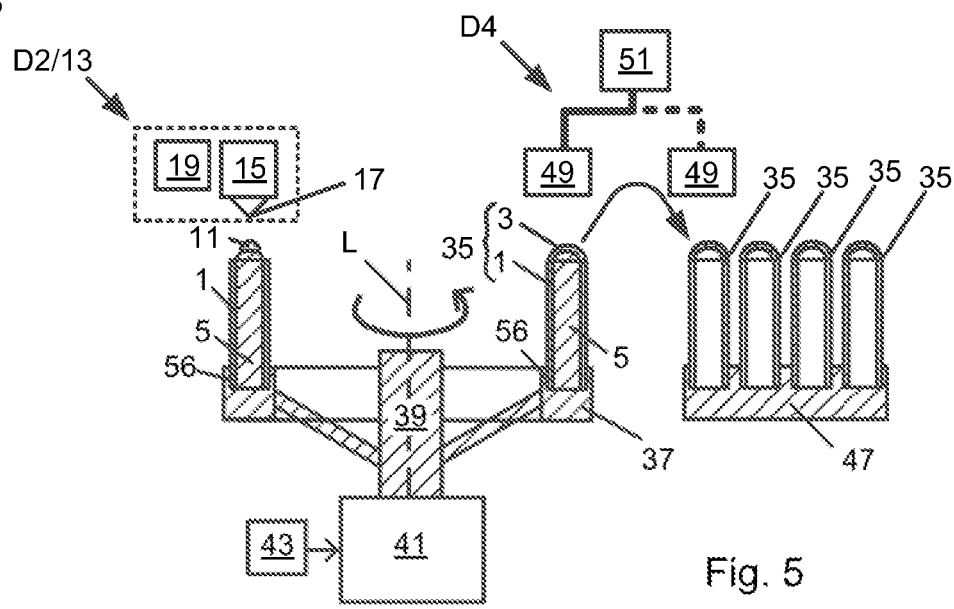
Fig. 5
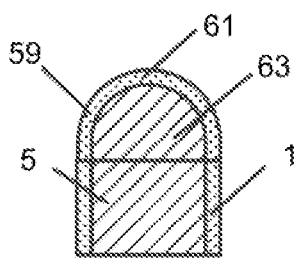
Fig. 6
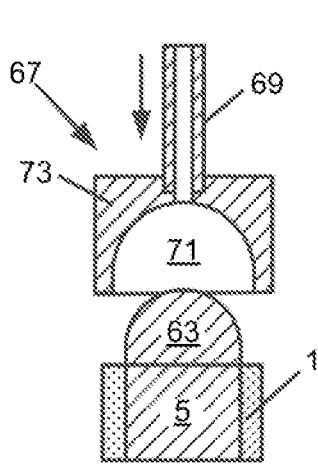
Fig. 7b1
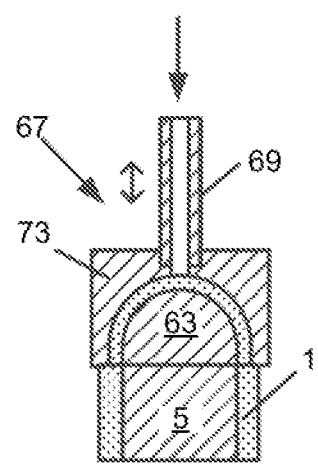
Fig. 7b2
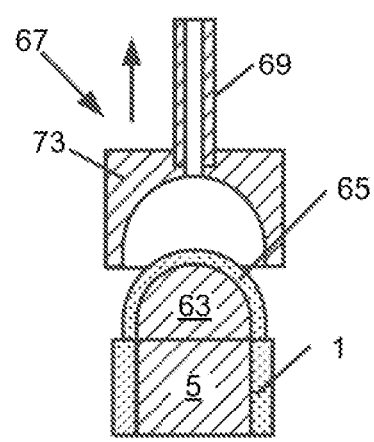
Fig. 7b3

METHOD OF AND APPARATUS FOR MANUFACTURING AT LEAST ONE MEASURING CELL

TECHNICAL FIELD

The present disclosure relates to a method of and an apparatus for manufacturing at least one measuring cell comprising a tube having a first end capped by a membrane consisting of an ion-selective material, a measuring cell manufactured by this method and a sensor comprising a measuring cell manufactured by this method.

BACKGROUND

Measuring cells comprising a tube having a first end closed off by a membrane consisting of an ion-selective material, like e.g. an ion-selective glass, are commonly used in various types of sensors. Examples are electrochemical sensors, like e.g., potentiometric sensors, applied in laboratories as well as in industrial applications to measure a variable of a medium, like e.g., an activity or a concentration of an analyte comprised in the medium or a pH-value of the medium.

These sensors commonly comprise a measuring cell comprising a tube closed off by an ion-selective membrane. In many cases, they additionally comprise a reference cell. To perform measurements, the measuring cells of these sensors are equipped with an electrolyte located inside the tube and an electrode extending into the electrolyte. Thus, an inside surface of the ion-selective membrane is exposed to the electrolyte located inside the tube and an outside surface of the membrane is exposed to the medium. Due to the ion-selective interaction of the membrane with the medium, an electric measurement potential corresponding to the variable to be measured can be derived via the electrode. Quantitative determination of the variable is, e.g., performed based on the measurement potential, e.g., by determining a difference between the measurement potential and a reference potential, like e.g., a reference potential provided by a reference cell.

In order for changes of the magnitude of the measured variable to have a measurable effect on the measurement potential or the difference between the measurement potential and the reference potential, an electrical impedance of the membrane should not exceed a predetermined limit, e.g., a limit given by a resolution and/or a measurement accuracy of a measurement device, e.g., measurement electronics, determining the measurable effect. Due to the low electrical conductivity of ion-selective materials available on the market, this requires for the membranes to be relatively thin. A thickness of the membranes smaller or equal to a few tenths of a millimeter is usually required to limit the electrical impedance to an acceptable magnitude, e.g., a magnitude of less than 3 G$\Omega$.

Ion-selective membranes constitute a key component of these sensors and their properties and dimensions are relevant factors with respect to the quality, the measurement accuracy and the performance of these sensors.

Manufacturing sufficiently thin membranes with high precision is a very demanding task. Traditionally glass blowing methods have been employed for this purpose. Examples are methods, as, e.g., described in US 2016/0176745 A1, wherein an open end of a hollow glass tube is dipped into a melt of ion-selective glass and then withdrawn again, thereby extracting a certain amount of glass melt. The thus-extracted melt covering the open end of the tube is then blown into shape by air pressure supplied through an opposite open end of the tube. Once the desired shape and wall thickness is achieved, the tube and the extracted melt is cooled down.

Extracting the correct amount of glass melt needed for each of the membranes to be manufactured requires for a very accurate control of the movement of the tube during the dipping process. In addition, the air pressure supplied to the tube during the blowing process needs to be very accurately controlled to reduce the manufacturing tolerances of the shape and the thickness of the thus-manufactured membrane to an acceptable range.

Due to the different coefficients of thermal expansion of the glass tube and the ion-selective glass of the membrane, there is a risk that the cooling process may cause cracks in the ion-selective glass and/or may induce thermomechanical tensions reducing the mechanical stability of the membrane.

Thus, manual performance of these glass-blowing methods requires highly skilled personnel and is time and cost-intensive. Even though some progress in automating glass-blowing has been achieved, time and cost-effective high precision manufacturing of larger numbers of ion-selective glass membranes remains a highly demanding task.

Accordingly, there remains a need for further contributions in this area of technology.

As an example, there is a need for a method of manufacturing measuring cells comprising a tube having a first end closed off by a membrane consisting of an ion-selective material, that enables a more time and cost-effective production and/or to minimize mechanical and/or thermomechanical stresses that may cause cracks and/or induce tensions into the membranes.

SUMMARY

The present disclosure discloses a method of manufacturing at least one measuring cell comprising a tube having a first end capped by a membrane consisting essentially of an ion-selective material, the method comprising the steps of:

providing a paste comprising all constituents of the ion-selective material, wherein the paste is transformable into the ion-selective material by heating the paste to melting and then cooling the thus-produced melt to a temperature below a melting point of the ion-selective material; and for each measuring cell to be manufactured:
providing the tube and mounting the tube onto a stick comprising an elongated body and a tip such that the stick extends through the tube;
dispensing a predetermined amount of the paste onto the tip extending through the tube;
heating the first end of the tube and heating the dispensed paste to a temperature causing the dispensed paste to melt and a thus-produced melt to form a film covering the tip and an end surface of the first end of the tube;
transforming the film into the membrane joined to the tube by cooling the first end of the tube and the film to a temperature below a melting point of the ion-selective material; and
separating the thus-manufactured measuring cell from the stick.

This method has the advantage, that dispensing the predetermined amount of paste on the tip constitutes a comparatively simple process, that can be performed much more easily than the dipping process employed in glass blowing methods to extract of the correct amount of glass melt. Further, it is an advantage, that a shape of each membrane is predetermined by a shape of an outer surface of the tip on which it is manufactured. Thus, in contrast to glass blowing methods, wherein the shape of each membrane depends on the control of the air pressure and the movement of the tube during the blowing process, the method described herein enables larger numbers of measurement cells having membranes of identical shape to be manufactured much more easily.

In an embodiment, the tip of the stick comprises at least one of: an outer surface having (e.g., defining) a shape corresponding to a shape of an inner surface of the membrane to be manufactured on the tip; and a center section, a dome-shaped center section or a flat center section surrounded by a curved outer edge of the tip.

In another embodiment, the predetermined amount of paste is dispensed onto the tip: in form of a lump deposited onto a center of the tip; in form of a paste layer covering the tip; in form of a paste layer covering the tip and an end surface of the first end of the tube; in form of a paste layer being rotationally symmetrical to a longitudinal axis of the stick; in form of a paste layer of uniform thickness covering the tip; in form of a paste layer, wherein a thickness of a center section of the paste layer covering a center section of the tip is larger than a thickness of a remainder of the paste layer surrounding the center section of the paste layer; or in form of a paste layer, wherein a thickness of a center section of the paste layer covering a center section of the tip is larger than a thickness of a remainder of the paste layer surrounding the center section of the paste layer, and wherein a size and the thickness of the center section and of the remainder of the paste layer are dimensioned such that gravity acting on the melt attained by subsequently heating the paste layer forms a film of uniform thickness and that the membrane produced by transforming the film into the ion-selective material has a uniform thickness.

In such an embodiment, the paste layer is manufactured by a dispenser comprising a paste supply line connected to an interior of a mold by the method steps of: placing the mold at a predetermined height above the tip, filling a gap between the mold and the tip with the predetermined amount of the paste supplied to the gap through the supply line, and subsequently lifting off the mold, wherein an inner surface of the mold surrounding the interior of the mold has a shape corresponding to a shape of an outside surface of the paste layer to be manufactured.

In such an embodiment, the mold is mounted on a support enabling the mold to be moved up and down in a direction running in parallel to a longitudinal axis of the stick, and the method comprises at least one of the steps of: by moving the mold in a direction parallel to a longitudinal axis of the stick towards the tip exerting a pressure on the paste layer forming inside the gap; and by moving the mold up and down a distance or a distance of 5 μm to 25 μm before lifting off the mold reducing adhesive forces between the mold and the paste layer after the paste layer has been dispensed onto the tip.

In another embodiment, the tube is a cylindrical tube, a glass tube, a glass tube consisting essentially of soda lime glass, a cylindrical glass tube or a cylindrical glass tube having at least one of: an inner diameter of 3 mm to 10 mm and a wall thickness of 0.2 mm to 1 mm; the ion-selective material is an ion-selective glass, a hydrogen ion ($H^+$) ion-selective glass or another ion-selective material; and the stick consists essentially of ceramic, tungsten or another material enabling the paste to be transformed into the ion-selective material on the tip and for thus-attained ion-selective material to be separated from the stick.

In another embodiment, the method comprises at least one of the steps of: providing the paste in form of a powder mixed with a liquid solution or in form of a powder consisting essentially of powder particles having a diameter or particle size smaller or equal to 5 μm mixed with a liquid solution, wherein the powder comprises all constituents of the ion-selective material and wherein the liquid solution is a solution comprising deionized water, an alcohol, an ethyl alcohol, a binder, an adhesive binder or another chemically inert solution; providing the paste in form of a paste having a viscosity of 50,000 centipoise to 100,000 centipoise; determining the predetermined amount of paste based on a volume of the membrane to be manufactured or determining a volume of the predetermined amount of the paste to be equal to a sum of a volume of the membrane to be manufactured and a volume shrinkage to be expected during transforming the paste into the ion-selective material of the membrane; mounting the tube onto the stick such that an end surface of a second end of the tube located opposite the first end sits on a flat surface of a support supporting the stick or on a bottom surface of an annular groove foreseen in a support supporting the stick, wherein the groove surrounds a bottom end of the stick.

The present disclosure further discloses a measuring cell manufactured by the method disclosed and comprising the membrane joined to the tube, wherein: the membrane comprises a center section manufactured on a center section of the tip and a curved outer rim manufactured on a curved outer edge of the tip, wherein the curved outer rim surrounds the center section of the membrane and is joined to the tube.

In an embodiment of the measuring cell, the membrane is: a membrane having a flat center section or a flat center section having a thickness of 0.05 mm to 0.25 mm; a dome shaped membrane or a dome shaped membrane having a thickness of 0.05 mm to 0.35 mm; a membrane having a uniform thickness; or a membrane, wherein a thickness of the center section of the membrane is smaller than a thickness of the outer rim of the membrane.

The present disclosure further discloses a sensor for measuring a variable comprising a measuring cell manufactured by the method disclosed, wherein the variable is an activity or a concentration of an analyte comprised in a medium or a pH-value of the medium, the sensor comprising: an electrolyte or a pH-buffer solution located in an interior of the measuring cell; and an electrode extending into the electrolyte; wherein an outer surface of the membrane is exposable to the medium and an inner surface of the membrane is in contact with the electrolyte.

In an embodiment, the sensor further comprises: a reference cell or a reference cell comprising an outer tube surrounding the tube of the measuring cell, the outer tube having an end section joined to the tube, such that the tube is surrounded by an annular interior of the reference cell surrounded by the outer tube; an electrode extending into an electrolyte located in the interior of the reference cell; and a diaphragm having an inner surface exposed to the electrolyte located in the interior of the reference cell and an outer surface exposable to the medium.

The present disclosure further discloses an apparatus for manufacturing measuring cells according to the method disclosed, the apparatus comprising: a support supporting at least one of the sticks or a set of the sticks employed to manufacture the measuring cells mounted onto the support; and at least one device embodied to perform at least one of the method steps of the method, the devices comprising at least one of: at least one pick-and-place machine each embodied to perform at least one of: mounting the tubes of the measuring cells onto the sticks and lifting the measuring cells off the sticks; a dispenser embodied to: a) dispense the predetermined amounts of paste onto the tips of the sticks; b) dispense the predetermined amounts of paste in form of lumps, wherein each lump is deposited onto a center of one of the tips of the sticks; or c) dispense the predetermined amounts of paste in form paste layers, wherein each paste layer is covering the tip of one of the sticks; and a heating apparatus, a heating apparatus comprising a laser or a $CO_2$ laser, or a heating apparatus comprising a burner providing an open flame, wherein the heating apparatus is embodied to heat the first end of the tubes and the dispensed paste.

In an embodiment the apparatus comprises a transportation system, transporting the sticks mounted on the support through a production line comprising the devices arranged an order corresponding to a sequence of the method steps to be performed by them.

In such an embodiment, the support is an annular support mounted onto a rotatable base rotatable around an axis of rotation extending through a center of the annular support; a longitudinal axis of each stick extends in parallel to the axis of rotation; and the transportation system comprises a step motor and a controller connected to the step motor and embodied to cause the rotatable base to rotate a predetermined amount in between consecutive synchronized performances of the method steps of manufacturing the measuring cells performed by the devices and to stand still during performance of the method steps.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein:

FIGS. 1a-1d show steps a) to d) of a method of manufacturing at least one measuring cell;

FIG. 2 shows a measuring cell manufactured by the method shown in FIGS. 1a-1d;

FIG. 5 shows a cross-sectional view of the apparatus of FIG. 3 in plane B-B shown in FIG. 3;

FIG. 6 shows a dome-shaped membrane manufactured on a dome-shaped tip;

FIG. 7 shows method steps of dispensing paste in form of a paste layer;

DETAILED DESCRIPTION

Figure 3:
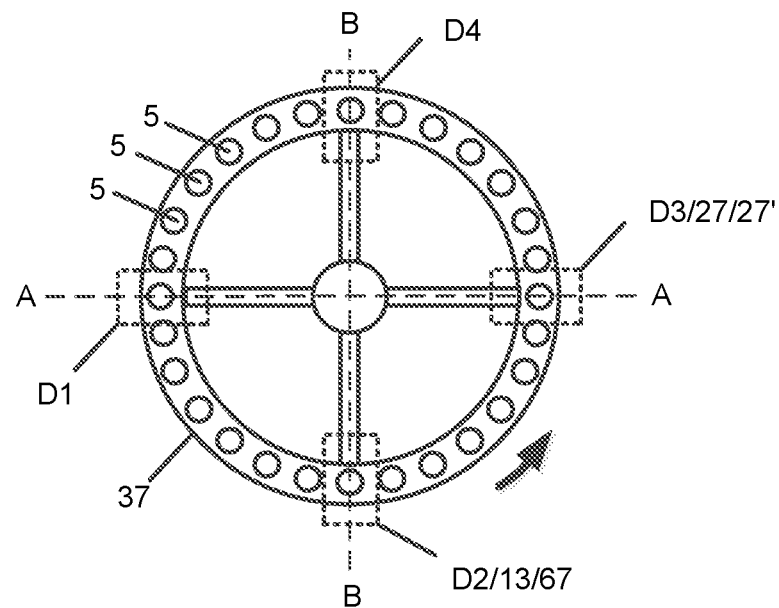
FIG. 3 shows a plan view of an apparatus performing the method steps shown in FIGS. 1a-1d.

The present disclosure includes a method of manufacturing at least one measuring cell comprising a tube 1 having a first end capped by a membrane 3 consisting of an ion-selective material.

The method comprises, for each measuring cell to be manufactured, the preparatory method steps of providing the tube 1 and of providing a paste that comprises all constituents of the ion-selective material of the membrane 3 to be manufactured and that is transformable into the ion-selective material by heating the paste to melt and subsequently cooling a thus-produced melt to a temperature below a melting point of the ion-selective material.

The tube 1 is may be a glass tube. To this extent, tubes consisting essentially of conventional glass, like e.g., soda lime glass, available on the market can be used. As an example, cylindrical tubes 1, e.g., tubes 1 having an inner diameter of 3 mm to 10 mm and/or a wall thickness of 0.2 mm to 1 mm can be used.

The ion-selective material of the membrane 3 may be an ion-selective glass. To this extent, various types of ion-selective glass known in the art and/or used as ion-selective material of membranes in electrochemical and/or potentiometric sensors known in the art can be used. Examples are ion-selective glasses, like e.g., $H^+$ ion-selective glasses. $H^+$ ion-selective glasses are often referred to as pH glasses and comprise a range of glasses suitable for various applications. As an alternative, it may be possible to use other ion-selective materials in combination with tubes consisting essentially of a corresponding tube material, enabling the ion-selective material to be joined to the tube as described below.

As an example, the paste is, e.g., provided in form of a powder comprising all constituents of the ion-selective material immersed (e.g., dissolved or suspended) in a liquid solution. To this extent powder particles of each of the constituents and the liquid solution can be mixed to form a homogeneous paste. As an alternative option, a block of ion-selective material can be finely ground into powder and subsequently mixed with the liquid solution.

As an option, the powder comprised in the paste is, e.g., a very fine powder, e.g., a powder consisting of powder particles having a diameter or particle size smaller or equal to 5 μm. This has the advantage that it enables a very homogeneous distribution of the powder particles immersed in the liquid solution to be achieved.

The liquid solution may be a chemically inert solution, like e.g., deionized water, an alcohol, like e.g., ethyl alcohol, or a binder, like e.g., an adhesive binder. These solutions provide the advantage that they evaporate when the paste is transformed into the ion-selective material.

The paste is used to manufacture the membrane 3 of each measuring cell to be manufactured on the first end of the tube 1 of the respective measuring cell by performing the method steps a) to d) shown in FIG. 1.

In method step a), the tube 1 is mounted onto a stick 5 comprising an elongated body 7 and a tip 9 such that the stick 5 extends through the tube 1.

The stick 5 may consist essentially of a material, like e.g., tungsten or a ceramic material, enabling the paste to be transformed into the ion-selective material on the tip 9 of the stick 5 and the thus-attained ion-selective material to be separated from the stick 5. In other words, the stick 5 is configured as a non-adhesive stick with respect to the paste, the melt attained by heating the paste, and the ion-selective material attained by cooling the melt on the stick 5.

Following step a), a predetermined amount of paste 11 is dispensed onto the tip 9 extending through the tube 1, as indicated in method step b) shown in FIG. 1.

Dispensing the paste 11 is, e.g., performed manually or carried out in a semi- or fully automated manner, e.g., by a dispenser 13 adapted for dispensing the paste. FIG. 1 shows an example of a dispenser 13 comprising a reservoir 15 containing the paste, an outlet 17, like e.g., a nozzle or a paste supply line, connected to the reservoir 15, and a controller 19, like e.g., a computer, a microcontroller or another device, connected to the reservoir 15 and/or the outlet 17 and configured to control the dispensing of the predetermined quantity of the paste 11 through the outlet 17.

Next, the dispensed paste 11 is transformed into the membrane 3 joined to the tube 1. As indicated in method step c) shown in FIG. 1, this transforming is done by heating the first end 21 of the tube 1 and by heating the paste 11 located on the tip 9 to a temperature causing the paste 11 to melt and a thus-produced melt to form a film 23 covering the tip 9 and an end surface 25 of the first end 21 of the tube 1.

As an option method step c) is, e.g., performed by selectively heating a limited area LA comprising the first end 21 of the tube 1, the tip 9 and the paste 11 located on the tip 9 by means of a heating apparatus 27 capable of heating the limited area LA. As shown in FIG. 1, the heating apparatus 27 can, e.g., by an apparatus comprising a laser 29, like e.g., an $CO_2$ laser, emitting laser light to the limited area LA. As an alternative indicated by dotted lines in FIG. 1, the heating apparatus 27' can, e.g., comprise a burner 31 providing an open flame 33. In such an embodiment, the limited area LA is heated by exposing it to the open flame 33.

Following this, the thus-produced film 23 shown in method step d) in FIG. 1 is then transformed into the membrane 3 joined to the first end 21 of the tube 1 by cooling the film 23 and the first end 21 to a temperature below a melting point of the ion-selective material. During this transformation, a section of the film 23 solidifying on the end surface 25 of the tube 1 will consequentially be joined (e.g., bonded, attached) to the end surface 25, thus providing a joint joining the membrane 3 produced by the transformation to the tube 1.

Heating not only the paste 11 but also the first end 21 of the tube 1 enhances the quality of the joint between the membrane 3 and the tube 1. Further, heating the paste 11 and the first end 21 of the tube 1 and subsequently cooling the film 23 as well as the first end 21 of the tube 1 ensures a fairly homogenous temperature profile in particular in the joint area, where the joint is to be established and thus reduces thermomechanical stresses caused by transforming the film 23 into the membrane 3 joined to the tube 1.

With respect to the transformation of the film 23 into the ion-selective material, active or passive cooling may be employed. When passive cooling is employed, the first end 21 of the tube 1 and the film 23 are allowed to cool simply due to being exposed to an ambient temperature, e.g., a room temperature, below the melting point of the ion-selective material. Active cooling is, e.g., performed by directing an air flow onto the limited area LA.

Following the transformation, all that remains to be done is to separate the thus-manufactured measuring cell 35 and the stick 5. Due to the non-adhesive material of the stick 5, this can be easily done by lifting the measuring cell 35 off the stick 5 or by pulling the stick 5 out of the measurement cell 35.

FIG. 2 shows a cross-sectional view of the thus-manufactured measuring cell 35.

The method provides the advantages mentioned above. A further advantage is that the method can be easily performed in a semi- or fully automated way, e.g., by an apparatus for manufacturing measuring cells 35 performing at least one, several, or all the method steps. This apparatus may include at least one of the following devices: a) a pick-and-place machine D1 mounting the tubes 1 on the sticks 5; b) a dispenser D2, like e.g., the dispenser 13 shown in FIG. 1, dispensing the paste on the tips 9 of the sticks 5; c) a heating apparatus D3, like e.g., the heating apparatus 27 or the heating apparatus 27' shown in FIG. 1, heating the first ends 21 of the tubes 1 and the dispensed paste 11; and d) a pick-and-place machine D4 lifting the measuring cells 35 off the sticks 5. These devices D1, D2, D3, D4 may be arranged in an order corresponding to the sequence of method steps a)-d) to be performed by them along a transportation system, transporting one or more of the previously described sticks 5 through a production line comprising the thus-arranged devices D1, D2, D3, D4.

Figure 4:
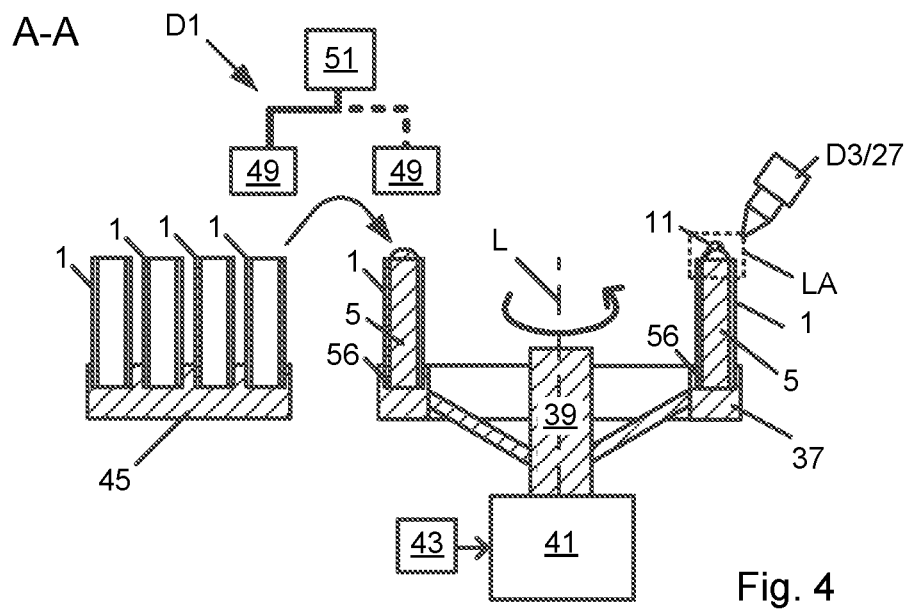
FIG. 4 shows a cross-sectional view of the apparatus of FIG. 3 in plane A-A shown in FIG. 3.

FIGS. 3 to 5 show an example of an apparatus for manufacturing measuring cells 35, wherein the devices D1, D2, D3, D4 are arranged around a transportation system comprising a rotatable annular support 37. As illustrated in FIG. 3 showing a top view of the apparatus including the support 37, a set of sticks 5 is mounted on the support 37. As shown, the sticks 5 are, e.g., arranged in a circle on the support 37.

As illustrated in FIG. 4 showing a cross section of the apparatus in plane A-A indicated in FIG. 3 and in FIG. 5 showing a cross section of the apparatus in plane B-B indicated in FIG. 3, the support 37 is mounted onto a rotatable base 39 rotatable around an axis of rotation L extending through a center of the annular support 37 as indicated by the arrows shown in FIGS. 3 to 5. Further, a longitudinal axis of each sticks 5 extends in parallel to the axis of rotation L.

In this embodiment the transportation system comprises a step motor 41 and a controller 43 connected to the motor 41 and configured, e.g., programmed, to cause the rotatable base 39 to rotate a predetermined amount in between consecutive synchronized performances of the method steps a)-d) performed by the devices D1, D2, D3, D4 and to stand still during performance of the method steps a)-d).

Due to the annular shape of the support 37 and the corresponding annular arrangement of the devices D1, D2, D3, D4, the production line is a circular line. As an alternative, other types of transportation systems, like e.g., a system comprising a conveyor belt transporting the sticks through a production line, like e.g., a production line, wherein the devices are arranged in a straight line, can be employed instead.

As shown in FIGS. 4 and 5, the tubes 1 to be mounted onto the sticks 5 are, e.g., be supplied to the pick-and-place machine D1 on a carrier 45 comprising a set of tubes 1 mounted on the carrier 45 and the measuring cells 35 lifted off the sticks 5 by the pick-and-place machine D4 are, e.g., mounted onto a carrier 47 by the pick-and-place machine D4. Alternatively, other means for providing the tubes 1 and for collecting the manufactured measuring cells 35 can be employed. Further, depending on the shape of the production line, a single pick-and-place machine can, e.g., be used to perform the task of the two pick-and-place machines D1 and D4 shown in FIGS. 3 to 5. In either case, each pick-and-place machine D1, D4, e.g., comprises a suction cup 49 for picking up the tubes 1 and/or the measuring cells 35 and a transporting system 51 for moving objects picked up by the suction cup 49 to their destination.

Regardless of the degree of automation employed, various embodiments of the method steps a) to d), as well as of the stick(s) 5 and/or other means, apparatus or machinery used to perform the method steps a) to d) can be employed without deviating from the scope of the invention. Several optional embodiments are described in more detail below. Even though they are each explained with respect to manufacturing a single measuring cell 35, they can each be employed in a similar way when more than one or larger numbers of measuring cells 35 are manufactured.

As an option, the paste is, e.g., a paste having a viscosity of 50,000 to 100,000 centipoise. This provides the advantage that dispensing the correct amount of paste can be performed with high accuracy. A viscosity of this size is, e.g., achieved by adjusting a ratio of the amount of powder and the amount of liquid solution comprised in the paste accordingly. As an example, a viscosity of 50,000 to 100,000 centipoise is, e.g., achieved by a ratio of 5 grams to 10 grams of a powder of ion-selective glass mixed with a volume of 1 milliliter to 2 milliliters of deionized water or alcohol. As an alternative another type of powder and/or another type of liquid solution can be used instead.

The predetermined amount of paste 11 dispensed on the tip 9 may be determined based on the volume of the membrane 3 to be manufactured. As an option, the manufacturing tolerance of the membrane 3, in particular of a thickness of the membrane 3, may be reduced by additionally taking into account a shrinkage to be expected due to the transformation of the paste 11 into the ion-selective material, e.g., due to the liquid solution evaporating during the transformation. To this extent, the volume of the predetermined amount of paste 11 is, e.g., equal to the sum of the volume of the membrane 3 to be manufactured and the volume shrinkage to be expected during the transformation.

As an option, each stick 5 is, e.g., configured as stick having a shape corresponding to a shape of an interior 53 of the measuring cell 35 to be manufactured on it. As shown in FIG. 2, the interior 53 consists of an inner space 53a surrounded by the tube 1 and an inner space 53b enclosed under the membrane 3. Thus, the elongated body 7 of the stick 5 is, e.g., of the same dimensions as the inner space 53a surrounded by the tube 1 and the tip 9 is of the same dimensions as the inner space 53b enclosed under the membrane 3.

As shown in FIG. 1 and FIGS. 3 to 5, a very precise positioning of each tube 1 on the respective stick 5 is, e.g., achieved when the stick 5 is mounted on a support, like e.g., the support 55 supporting the single stick 5 shown in FIG. 1 or the support 37 supporting a set of sticks 5 shown in FIGS. 3 to 5, and the tube 1 is mounted onto the stick 5 such that an end surface of a second end of the tube 1 located opposite the first end 21 sits on a flat surface of the support 55, 37. As an option, shown in FIG. 1 and FIGS. 3 to 5, the support 55, 37 may, e.g., comprise an annular groove 56 surrounding a bottom end of the respective stick 5 located opposite the tip 9. In such an embodiment, each tube 1 is mounted such, that the end surface of the second end of the tube 1 sits on a bottom surface of the groove 56.

Since each membrane 3 is manufactured on the tip 9 of the respective stick 5, the shape of the membrane 3 corresponds to the shape of the tip 9. Thus, measuring cells having membranes of various shape can by manufactured on tips of corresponding shape. Even though it is possible to produce flat membranes on sticks having a flat top surface, located at the same height as the end surface of the first end of the tube during manufacturing of the membrane, better results are achieved, when the membrane 3 comprises a center section surrounded by a curved outer rim manufactured on the tip 9 of corresponding shape having a center section surrounded by a curved outer edge.

In the example shown in FIGS. 1 and 2, the membrane 3 comprises a flat center section 57, surrounded by the curved outer rim 59 joined to the first end 21 of the tube 1. Correspondingly, the tip 9 used to manufacture this membrane 3 comprises a flat center section surrounded by the curved outer edge.

The flat center section 57 provides the advantage that the film 23 consisting of the melt of the paste 11 will have a very uniform thickness across the flat center section of the tip 9. This enables very thin flat center sections 57 of the membranes 3 to be manufactured with high accuracy. As an example, the center section of the film 23 and thus also the flat center section 57 of the membrane 3 can, e.g., be manufactured to have a thickness of 0.05 mm to 0.25 mm. Further, the thickness of the flat center section 57 of the membrane 3 can be manufactured very accurately, e.g., within a tolerance of the thickness of +/−10 μm or less and/or a uniformity of the thickness, wherein thickness variations are smaller or equal to 5% of the thickness of the flat center section 57.

As an alternative, the center section of the tip and the membrane may have a different shape. FIG. 6 shows an example of a dome shaped membrane 61 manufactured on a dome-shaped tip 63 of the stick 5. In this embodiment a section of the dome shaped membrane 61 manufactured on the curved outer edge of the dome shaped tip 63 constitutes the curved outer rim 59 of the membrane 61 joined to the tube 1. As an example, the dome shaped membrane 61 can, e.g., be manufactured to have a thickness of 0.05 mm to 0.35 mm.

Regardless of the shape of the center section, by means of the curved outer edge of the tip 9, 63 and the corresponding curved outer rim 59 of the membrane 3, 61 sharp transitions, sharp corner and/or sharp edges are avoided in the vicinity of the joint joining the membrane 3, 61 to the tube 1. This leads to a significant reduction of thermomechanical stresses induced in the membrane 3, 63 and the joint during the transformation of the film 23 into the membrane 3, 61 joined to the tube 1.

Because each membrane 3, 61 is manufactured on the tip 9, 61 of the respective stick 5, an inner surface of the membrane 3, 61 will have the same shape as an outer surface of the tip 9, 61 on which it is manufactured. The thickness of the center section 57 of the membrane 3, 61 as well as the thickness of the outer rim 59 of the membrane 3, 61 both depend on the predetermined amount of paste 11 dispensed onto the tip 9, 63 as well as on the shape of the tip 9, 63.

As shown in FIGS. 1 and 5 the predetermined amount of paste 11 dispensed onto the tip 9 of the stick 5 is, e.g., dispensed in form of a lump deposited onto a center of the tip 9. In such an embodiment, gravity acting in a direction parallel to the longitudinal axis of the stick 5 on the melt produced by subsequently heating the lump to melt causes the melt to spread into the film 23 covering the tip 9 and the end surface 25 of the tube 1.

As an alternative option, the predetermined amount of paste is, e.g., dispensed onto the tip 9, 63 in form of a paste layer 65 covering the tip 9, 63.

As illustrated in FIG. 7, the paste layer 65 is, e.g., manufactured by a dispenser 67 comprising a paste supply line 69 connected to an interior 71 of a mold 73. In this embodiment, an inner surface of the mold 73 surrounding the interior 71 is of the same shape as an outside surface of the paste layer 65 to be manufactured. This enables the predetermined amount of paste to be dispensed onto the tip 63 in form of the paste layer 65 by the method steps of: b1) placing the mold 73 at a predetermined height above the tip 63; b2) filling a gap between the mold 73 and the tip 63 with paste supplied to the gap through the supply line 69; and b3) of subsequently lifting off the mold 73 again. To this extent, the mold 73 may be mounted on a support enabling the mold 73 to be moved up and down in a direction running in parallel to the longitudinal axis of the stick 5, as indicated by the arrows shown in method step b1) and b3) shown in FIG. 7.

As an option, a movement of the mold 73 in a direction parallel to the longitudinal axis of the stick 5 towards the tip 63 is, e.g., be employed to exert a pressure on the paste layer 65 forming on the tip 63 inside the gap during method step b2). This pressure facilitates attaining the desired shape of the paste layer 65.

As an additional or alternative option, moving the mold 73 up and down a very short distance, like e.g., a distance of 5 μm to 25 μm, as indicated by the double arrow shown in method step b2), before lifting off the mold 73 reduces adhesive forces between the mold 73 and the paste layer 65, which in turn facilitates lifting the mold 73 off the paste layer 65 after the paste layer 65 has been dispensed onto the tip 63.

As an alternative, the paste layer 65 is, e.g., manufactured by dispensing the predetermined amount of paste in form of a lump deposited onto the tip as shown in FIG. 1 and subsequently reshaping the dispensed paste.

Regardless of the method employed to manufacture the paste layer 65 on the tip 63, the paste layer 65 of dispensed paste is subsequently heated to melt. Consequently, gravity acting in parallel to the longitudinal axis of the stick 5 on the thus-produced melt reduces a thickness of the resulting film of melt in an area covering the center section of the tip 63 and increases a thickness of the resulting film in an area covering the outer edge of the tip 63 and abutting on the end surface 25 of the tube 1. This effect is, e.g., used to adjust the thickness of center section and the thickness of the outer rim of the membrane manufactured this way. Two examples are shown in FIGS. 8 and 9.

Figure 8:
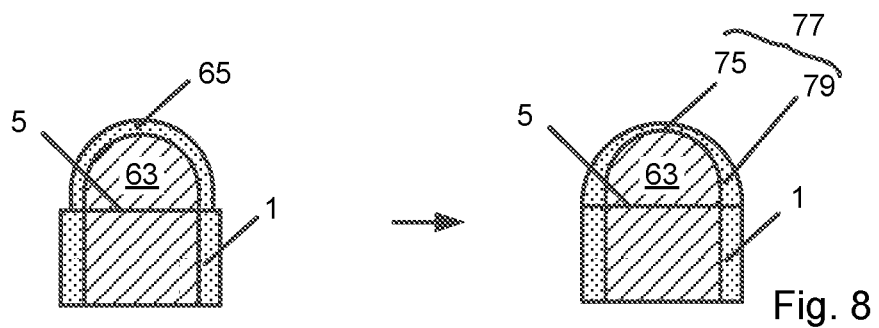
FIG. 8 shows a paste layer of uniform thickness applied to manufacture a membrane having a thinner center section.

In the embodiment shown in FIG. 8, the paste layer 65 covering the tip 63 is a layer of uniform thickness shown on the left-hand side of FIG. 8. Consequently, gravity causes a center section of the film produced by melting this paste layer 65 to be thinner than a section of the film surrounding the center section of the film. Therefore, as shown on the right-hand side of FIG. 8, the thickness of the center section 75 of the membrane 77 produced by transforming this film into ion-selective material is smaller than the thickness of the outer rim 79 of the membrane 77 joined to the tube 1.

The smaller thickness of the center section 75 provides the advantage of a correspondingly low electrical impedance of the membrane 77 in this area. The larger thickness of the outer rim 79 provides the advantage that it ensures a high mechanical stability of the joint and makes the joint area less susceptible to impairments caused by thermomechanical stresses. This is especially beneficial when a difference between a coefficient of thermal expansion of the ion-selective material of the membrane 77 and a coefficient of thermal expansion of the tube 1 is comparatively large.

Figure 9:
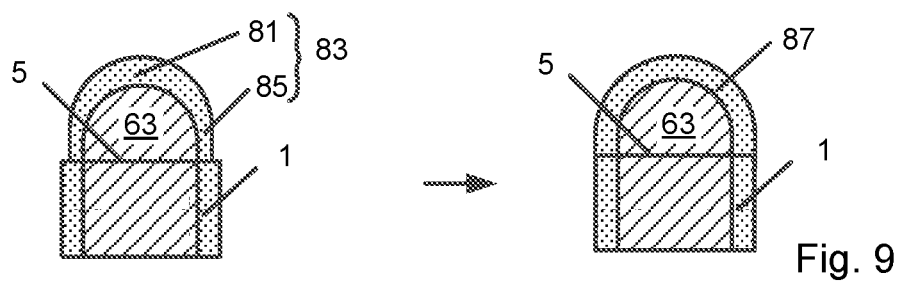
FIG. 9 shows a paste layer of non-uniform thickness applied to manufacture a membrane of uniform thickness.

FIG. 9 shows another example, wherein the thickness of a center section 81 of the paste layer 83 covering the center section of tip 63, shown on the left-hand side of FIG. 9, is larger than the thickness of a remainder 85 of this paste layer 83. As an option, a size and the thickness of the center section 81 and of the remainder 85 of the paste layer 83 are, e.g., dimensioned such that gravity acting on the melt produced by subsequently heating the paste layer 83 forms a film of uniform thickness. In such an embodiment, as shown on the right-hand side in FIG. 9, the membrane 87 produced by transforming the film has a uniform thickness.

When thus-manufactured measuring cells are used in a sensor, like e.g., one of the sensors described below, this provides the advantage that a larger area of the membrane 87 having a uniform, thin thickness results in a higher sensitivity of the sensor In the examples shown in FIGS. 8 and 9, the tip 63 is a dome shaped tip, but tips having a different shape, like e.g., the tip 9 having the flat center section shown in FIGS. 1 to 5, can be used instead.

Regardless of the thickness of individual sections of the paste layer 65, 83, the paste layer 65, 83 preferably covers the end surface 25 of the first end of the tube 1. As an option, it is preferably rotationally symmetrical to a longitudinal axis of the stick 5.

Figure 10:
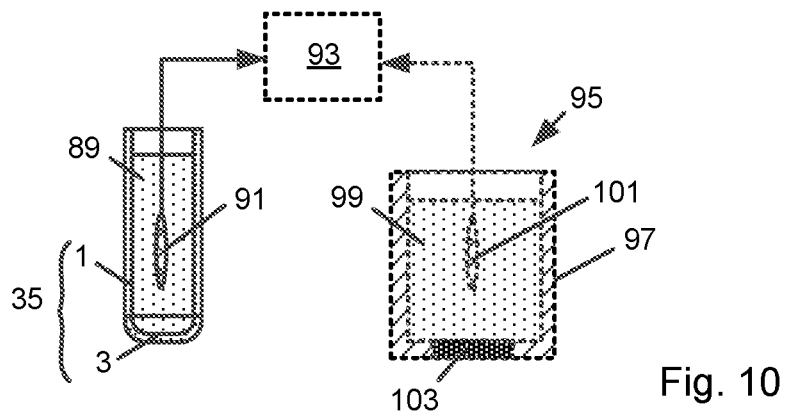
FIG. 10 shows a sensor comprising the measuring cell shown in FIG. 2.
Figure 11:
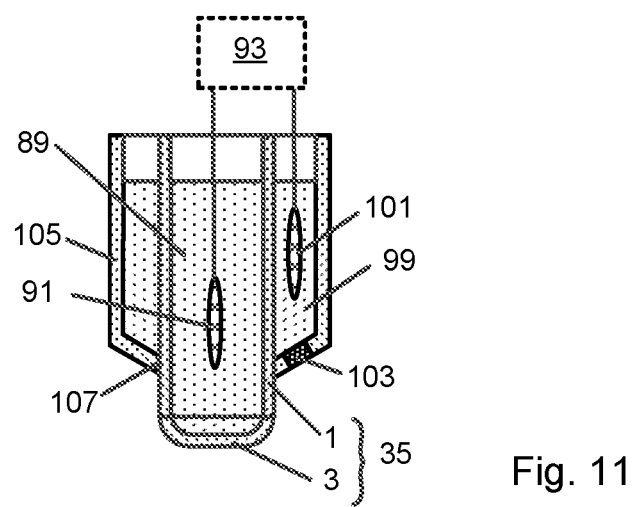
FIG. 11 shows a sensor comprising the measuring cell shown in FIG. 2 surrounded by a reference-cell.

Measuring cells 35 manufactured by the method described above can be used in various applications. FIGS. 10 and 11 each show an example of a sensor comprising a measurement cell 35 manufactured as described above. Each sensor, is e.g., a sensor for measuring a variable of a medium, like e.g., an activity or a concentration of an analyte comprised in the medium, e.g., a pH-value of the medium, like e.g., an electrochemical and/or potentiometric sensor. In such an embodiment, an interior of the measuring cell 35 is, e.g., filled with an electrolyte 89, like e.g., a pH buffer solution, such that an inner surface of the membrane 3 is in contact with the electrolyte 89, and an electrode 91 is disposed in the measuring cell 35 such that the electrode 91 extends into the electrolyte 89. The outer surface of the membrane 3 is exposable to the medium. Thus, due to the ion-selective interaction of the membrane 3 with the medium, an electric measurement potential corresponding to the variable to be measured can be derived via the electrode 91 extending into the electrolyte 89.

As an option, the electrode 91 is, e.g., connected to a measurement device 93, e.g., measurement electronics, embodied to quantitatively determine the variable based on the measurement potential provided by the electrode 91 or based on a difference between the measurement potential and a reference potential, e.g., a reference potential provided by a reference-cell 95, provided to the measurement device 93.

In these applications, the time and cost-efficient manufacturing of the measuring cells 35 described above not only reduces the manufacturing costs of these sensors but also improves their quality, in particular due to the consistent membrane shape of each of the membranes 3, 61, 77, 87 manufactured by this method.

With respect to the optional reference cell 95, reference cells known in the art can be employed. In the embodiment shown in FIG. 10, the optional reference cell 95 is embodied as a separate cell comprising a housing 97, an electrolyte 99 located inside the housing 97, an electrode 101 extending into the electrolyte 99 and a diaphragm 103 inserted into a wall section of the housing 97 such that an inner surface of the diaphragm 103 is exposed to the electrolyte 99 comprised in the housing 97 and an outer surface of the diaphragm 103 is exposable to the medium.

FIG. 11 shows an alternative embodiment that differs from the sensor shown in FIG. 10 in that the reference cell is configured as a half-cell surrounding a section of the tube 1 of the measuring cell 35. To this extent, the reference cell comprises an outer tube 105 surrounding the tube 1 of the measuring cell 35. The outer tube 105 comprises an end section 107 joined to the tube 1 and the electrolyte 99 is filled into an annular interior of the reference cell limited on the outside by the outer tube 105 surrounding the tube 1 of the measuring cell 35 and limited on the inside by the tube 1 of the measurement cell 35. Like in the embodiment shown in FIG. 10, the electrode 101 is inserted into the electrolyte 99 comprised in the half-cell and the diaphragm 103 is inserted into a wall section of the outer tube 105 such that the inner surface of the diaphragm 103 is exposed to the electrolyte 99 and the outer surface of the diaphragm 103 is exposable to the medium.

With respect to sensors comprising the reference cell surrounding the measuring cell 35, the method of manufacturing at least one measuring cell 35 as described above may comprise additional steps of providing the outer tube 105 and of joining the outer tube 105 to the tube 1 of the measuring cell 35. As an example, the outer tube 105, e.g., consists of glass and/or is, e.g., joined to the tube 1 by glass soldering.

Joining the outer tube 105 to the tube 1 is either performed before or after the membrane 3 capping the first end 21 of the tube 1 is manufactured as described above. In the first case, the outer tube 105 is, e.g., joined to the tube 1 before the tube 1 is mounted onto the stick 5 or before the paste 11 is dispensed onto the tip 9 of the stick 5. In the second case, the outer tube 105 is, e.g., joined to the tube 1 before or after the measuring cell 35 comprising the tube 1 and the membrane 3 is removed from stick 5.

The invention claimed is:

1. A method of manufacturing a measuring cell comprising a tube having a first end capped by a membrane consisting essentially of an ion-selective material, the method comprising:
    providing a paste comprising all constituents of the ion-selective material, wherein the paste is transformable into the ion-selective material by heating the paste into a melt and cooling the thus-produced melt to a temperature below a melting point of the ion-selective material; and
    for each measuring cell to be manufactured:
        providing the tube and mounting the tube onto a stick comprising an elongated body and a distal tip such that the stick extends through the tube;
        dispensing an amount of the paste onto the tip of the stick extending through the tube;
        heating the first end of the tube and heating the dispensed paste to a temperature causing the dispensed paste to melt and the thus-produced melt to form a film covering the tip and an end surface of the first end of the tube;
        transforming the film into the membrane joined to the tube by cooling the first end of the tube and the film to a temperature below the melting point of the ion-selective material, thereby forming a measuring cell; and
        separating the thus-formed measuring cell from the stick.

2. The method of claim 1, wherein the tip of the stick comprises at least one of:
    an outer surface defining a shape corresponding to a shape of an inner surface of the membrane to be manufactured on the tip; and
    a center section, a dome shaped center section or a flat center section surrounded by a curved outer edge of the tip.

3. The method of claim 1, wherein the predetermined amount of paste is dispensed onto the tip:
    in form of a lump deposited onto a center of the tip;
    in form of a paste layer covering the tip;
    in form of a paste layer covering the tip and an end surface of the first end of the tube;
    in form of a paste layer being rotationally symmetrical to a longitudinal axis of the stick;
    in form of a paste layer of uniform thickness covering the tip;
    in form of a paste layer, wherein a thickness of a center section of the paste layer covering a center section of the tip is larger than a thickness of a remainder of the paste layer surrounding the center section of the paste layer; or
    in form of a paste layer, wherein a thickness of a center section of the paste layer covering a center section of the tip is larger than a thickness of a remainder of the paste layer surrounding the center section of the paste layer, and wherein a size and the thickness of the center section and of the remainder of the paste layer are dimensioned such, that gravity acting on the melt attained by subsequently heating the paste layer forms a film of uniform thickness and that the membrane produced by transforming the film into the ion-selective material has a uniform thickness.

4. The method of claim 3, wherein the paste layer is manufactured by a dispenser comprising a paste supply line connected to an interior of a mold by the method steps of:
    placing the mold at a predetermined height above the tip, filling a gap between the mold and the tip with the predetermined amount of the paste supplied to the gap through the supply line, and
    subsequently lifting off the mold,
    wherein an inner surface of the mold surrounding the interior of the mold has a shape corresponding to a shape of an outside surface of the paste layer to be manufactured.

5. The method of claim 4, wherein the mold is mounted on a support configured to enable the mold to be moved up and down in a direction running in parallel to a longitudinal axis of the stick, the method comprising at least one of the steps of:
    by moving the mold in a direction parallel to a longitudinal axis of the stick towards the tip exerting a pressure on the paste layer forming inside the gap; and
    by moving the mold up and down a distance or a distance of 5 µm to 25 µm before lifting off the mold reducing adhesive forces between the mold and the paste layer after the paste layer has been dispensed onto the tip.

6. The method of claim 1, wherein:
    the tube is a cylindrical tube, a glass tube, a glass tube consisting essentially of soda lime glass, a cylindrical glass tube or a cylindrical glass tube having at least one of: an inner diameter of 3 mm to 10 mm and a wall thickness of 0.2 mm to 1 mm;
    the ion-selective material is an ion-selective glass, an $H^+$-ion-selective glass or another ion-selective material; and
    the stick consists essentially of ceramic, tungsten or another material that enables the paste to be transformed into the ion-selective material on the tip and for thus-attained ion-selective material to be separated from the stick.

7. The method of claim 1, comprising at least one of the steps of:
    providing the paste in form of a powder mixed with a liquid solution or in form of a powder consisting of powder particles having a diameter or particle size smaller or equal to 5 µm mixed with a liquid solution, wherein the powder comprises all constituents of the ion-selective material and wherein the liquid solution is a solution comprising deionized water, an alcohol, an ethyl alcohol, a binder, an adhesive binder or another chemically inert solution;

providing the paste in form of a paste having a viscosity of 50,000 centipoise to 100,000 centipoise;

determining the predetermined amount of paste based on a volume of the membrane to be manufactured or determining a volume of the predetermined amount of the paste to be equal to a sum of a volume of the membrane to be manufactured and a volume shrinkage to be expected during transforming the paste into the ion-selective material of the membrane;

mounting the tube onto the stick such, that an end surface of a second end of the tube located opposite the first end sits on a flat surface of a support supporting the stick or on a bottom surface of an annular groove foreseen in a support supporting the stick, wherein the groove surrounds a bottom end of the stick.

8. A measuring cell manufactured by the method of claim 1 comprising the membrane joined to the tube, wherein:
the membrane comprises a center section manufactured on a center section of the tip and a curved outer rim manufactured on a curved outer edge of the tip, wherein the curved outer rim surrounds the center section of the membrane and is joined to the tube.

9. The measuring cell according to claim 8, wherein the membrane is:
a membrane having a flat center section or a flat center section having a thickness of 0.05 mm to 0.25 mm;
a dome shaped membrane or a dome shaped membrane having a thickness of 0.05 mm to 0.35 mm;
a membrane having a uniform thickness; or
a membrane, wherein a thickness of the center section of the membrane is smaller than a thickness of the outer rim of the membrane.

10. A sensor for measuring a variable comprising a measuring cell manufactured by the method of claim 1, wherein the variable is an activity or a concentration of an analyte comprised in a medium or a pH-value of the medium, the sensor comprising:
an electrolyte or a pH-buffer solution located in an interior of the measuring cell; and
an electrode extending into the electrolyte;
wherein an outer surface of the membrane is exposable to the medium and an inner surface of the membrane is in contact with the electrolyte.

11. The sensor according to claim 10, further comprising:
a reference cell or a reference cell comprising an outer tube surrounding the tube of the measuring cell, the outer tube having an end section joined to the tube, such that the tube is surrounded by an annular interior of the reference cell surrounded by the outer tube;
an electrode extending into an electrolyte located in the interior of the reference cell; and
a diaphragm having an inner surface exposed to the electrolyte located in the interior of the reference cell and an outer surface exposable to the medium.

12. An apparatus for manufacturing measuring cells according to the method of claim 1, the apparatus comprising:
a support supporting at least one of the sticks or a set of the sticks employed to manufacture the measuring cells mounted onto the support; and
at least one device embodied to perform at least one of the method steps of the method, the devices comprising at least one of:
at least one pick-and-place machine each embodied to perform at least one of: mounting the tubes of the measuring cells onto the sticks and lifting the measuring cells off the sticks;
a dispenser embodied to:
a) dispense the predetermined amounts of paste onto the tips of the sticks;
b) dispense the predetermined amounts of paste in form of lumps, wherein each lump is deposited onto a center of one of the tips of the sticks; or
c) dispense the predetermined amounts of paste in form paste layers, wherein each paste layer is covering the tip of one of the sticks; and
a heating apparatus, a heating apparatus comprising a laser or a $CO_2$ laser, or a heating apparatus comprising a burner providing an open flame, wherein the heating apparatus is embodied to heat the first end of the tubes and the dispensed paste.

13. The apparatus according to claim 12, comprising a transportation system, transporting the sticks mounted on the support through a production line comprising the devices arranged an order corresponding to a sequence of the method steps to be performed by them.

14. The apparatus according to claim 13, wherein:
the support is an annular support mounted onto a rotatable base rotatable around an axis of rotation extending through a center of the annular support;
a longitudinal axis of each stick extends in parallel to the axis of rotation; and
the transportation system comprises a step motor and a controller connected to the step motor and embodied to cause the rotatable base to rotate a predetermined amount in between consecutive synchronized performances of the method steps of manufacturing the measuring cells performed by the devices and to stand still during performance of the method steps.

* * * * *